(12) United States Patent
Pearson et al.

(10) Patent No.: US 7,706,157 B2
(45) Date of Patent: Apr. 27, 2010

(54) SYSTEMS AND METHODS INVOLVING BALANCING CURRENTS FOR THYRISTORS

(75) Inventors: William Robert Pearson, Roanoke, VA (US); Pedro Monclova, Salem, VA (US)

(73) Assignee: General Electric Company, Schenectady, NY (US)

( * ) Notice: Subject to any disclaimer, the term of this patent is extended or adjusted under 35 U.S.C. 154(b) by 379 days.

(21) Appl. No.: 11/950,837

(22) Filed: Dec. 5, 2007

(65) Prior Publication Data

US 2009/0147552 A1    Jun. 11, 2009

(51) Int. Cl.
*H02M 7/122* (2006.01)

(52) U.S. Cl. .................. 363/56.05; 363/55; 323/207; 373/105

(58) Field of Classification Search ... 363/56.01–56.05, 363/50, 55, 58, 66–68, 41; 323/205–209, 323/272, 211; 373/18–22, 101–105, 135
See application file for complete search history.

(56) References Cited

U.S. PATENT DOCUMENTS

| | | | | |
|---|---|---|---|---|
| 4,891,741 | A | * | 1/1990 | Slattery et al. ............... 363/35 |
| 5,015,945 | A | | 5/1991 | Radun |
| 5,239,554 | A | * | 8/1993 | Gensini et al. ............. 373/102 |
| 5,604,423 | A | * | 2/1997 | Degeneff et al. ........... 323/258 |
| 6,043,999 | A | * | 3/2000 | Ehrenberg et al. ........... 363/89 |
| 6,603,795 | B2 | * | 8/2003 | Ma et al. .................... 373/102 |
| 7,368,890 | B2 | * | 5/2008 | Pande et al. ................ 318/812 |

* cited by examiner

*Primary Examiner*—Rajnikant B Patel
(74) *Attorney, Agent, or Firm*—Cantor Colburn LLP

(57) ABSTRACT

An exemplary embodiment includes a method for balancing thyristor bridge circuits, the method comprising, determining currents of thyristors in a first leg of thyristors of a thyristor bridge circuit, determining a first set of gate firing times for the thyristors in the first leg of thyristors responsive to determining the current of the thyristors in the first gate of thyristors, wherein the first set of gate firing times are operative to balance a current load between the thyristors in the first leg of thyristors, and gating the thyristors in the first leg of thyristors according to the first set of gate firing times.

12 Claims, 3 Drawing Sheets

SYSTEMS AND METHODS INVOLVING BALANCING CURRENTS FOR THYRISTORS

BACKGROUND OF THE INVENTION

Embodiments of the invention relate generally to power semiconductor converters, and more particularly to measuring the current in thyristors and balancing the current load on thyristor bridge circuits.

In this regard, thyristor bridge circuits connected in parallel include legs. A leg is a group of thyristors wherein each thyristor of the leg occupies a similar position in a thyristor bridge circuit. In operation, each thyristor in a leg is often gated at the same time.

When the thyristors in a leg are gated at the same time, there may be a current load imbalance between the thyristors in the leg. One reason for the current imbalance may, for example, be caused by the geometric differences among each thyristor in the leg. For example, one thyristor of a leg may have contact points closer to a power bus than another thyristor in the leg resulting in a current imbalance once the leg is gated. A current imbalance may increase the heating of an individual thyristor that may cause the thyristor to fail prematurely.

Thus, it is desirable to use an apparatus and method for controlling a thyristor bridge circuit that allows each thyristor in a leg to share a substantially equal distribution of the current load when the thyristors in the leg are gated.

BRIEF DESCRIPTION OF THE INVENTION

An exemplary embodiment of the present invention includes a method for balancing thyristor bridge circuits, the method comprising, determining currents of thyristors in a first leg of thyristors of a thyristor bridge circuit, determining a first set of gate firing times for the thyristors in the first leg of thyristors responsive to determining the current of the thyristors in the first gate of thyristors, wherein the first set of gate firing times are operative to balance a current load between the thyristors in the first leg of thyristors, and gating the thyristors in the first leg of thyristors according to the first set of gate firing times.

An exemplary embodiment of the present invention includes an exemplary system for balancing thyristor bridge circuits comprising, a first thyristor bridge circuit, wherein the first thyristor bridge circuit includes a first plurality of thyristors, a second thyristor bridge circuit, wherein the second thyristor bridge circuit includes a second plurality of thyristors, a first leg comprising a first thyristor of the first plurality of thyristors and a second thyristor of the second plurality of thyristors, a processor to determine the current values of the thyristors of the first leg and determine a gate firing time for the thyristors in the first leg responsive to determining the current of the thyristors in the first gate, wherein the gate firing times are operative to balance a current load between the thyristors in the first leg, and send gating signals to the thyristors in the first leg according to the gate firing times.

An alternate exemplary embodiment of the present invention includes an exemplary method for determining a set of gate firing times for thyristor bridge circuits comprising, receiving a current value of a first thyristor and a current value of a second thyristor from a first leg of thyristors, determining a lowest thyristor current value, subtracting the lowest thyristor current value from the current value of the first thyristor and the current value of the second thyristor to yield a first error signal and a second error signal, multiplying the first error signal and the second error signal with a gain multiplier to yield a first time delay signal and a second time delay signal, integrating the first time delay signal and the second time delay signal to yield a first new time delay signal and a second new time delay signal, determining the lowest new time delay signal, subtracting the lowest new time delay signal from the first new time delay signal and the second new time delay signal, and adding a nominal firing time value to the first new time delay signal and the second new time delay signal to yield a first thyristor gate firing time and a second thyristor gate firing time.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Further, various operations may be described as multiple discrete steps performed in a manner that is helpful for understanding embodiments of the present invention. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

Thyristor bridge circuits may be used in power distribution systems. For example, a thyristor bridge can rectify the ac current from a transformer source and use the resultant dc current in the field of generator systems. These systems may include a number of thyristor bridge circuits connected in parallel. The bridge circuits comprise legs that include a thyristor from a similar position in each parallel bridge circuit. In operation, the thyristors in a leg are usually gated at the same time. Often the current load of the thyristors in a leg is not balanced because, for example, the geometric relationships of the thyristors thus interconnecting inductances in the bridge circuits are not the same for each thyristor in a leg.

Figure 1:
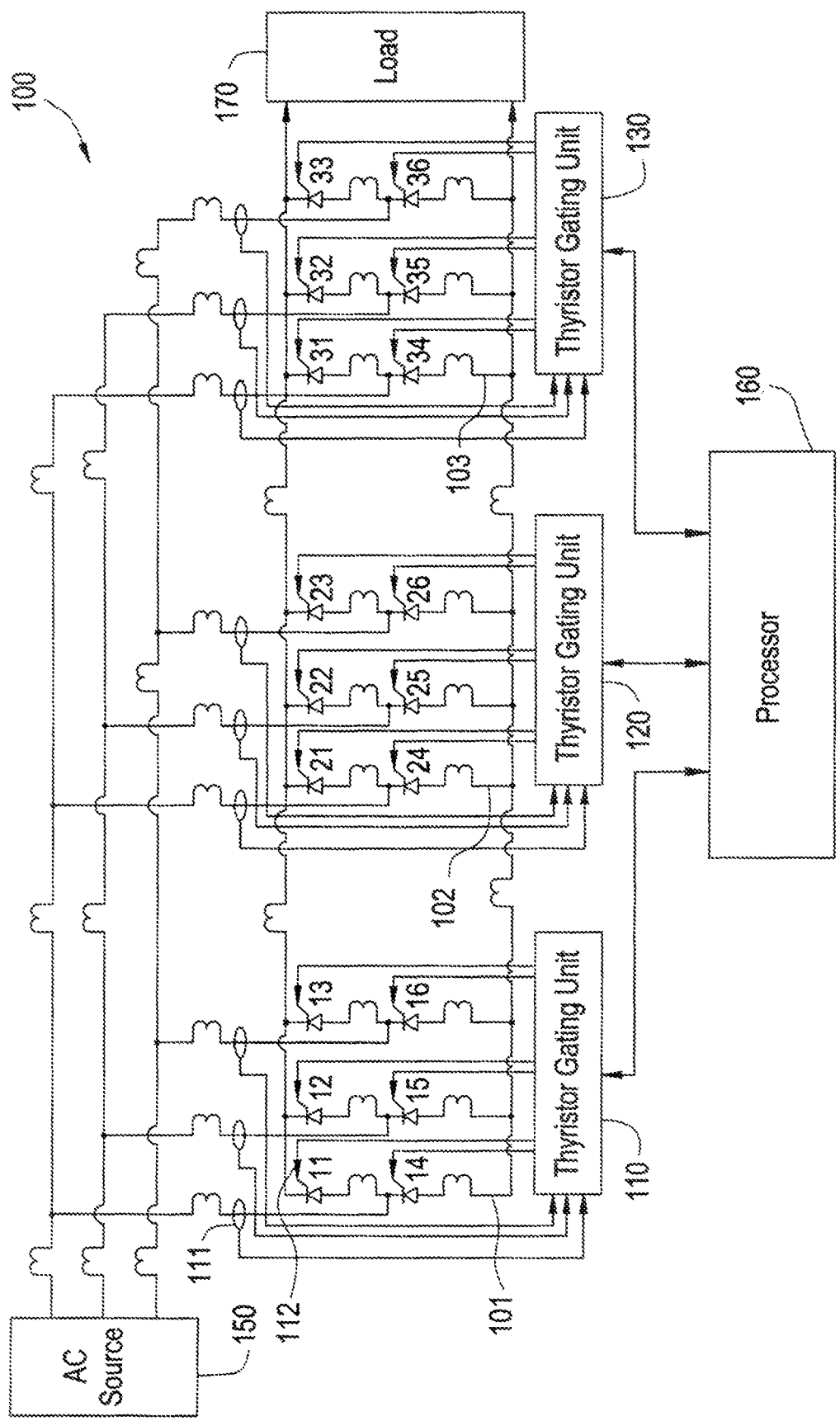
FIG. 1 is a block diagram of an exemplary system for determining and controlling the current of a plurality of thyristors in bridge circuits.

An exemplary embodiment of a system 100 illustrated in FIG. 1 may be used to control the gating times and current load of a number of thyristor bridge circuits in parallel. In this regard, referring to FIG. 1, thyristor bridge circuits 101, 102, and 103 are connected in parallel. The illustrated exemplary embodiment shows three thyristor bridge circuits, however other embodiments may include more or less thyristor bridge circuits. The thyristor bridge circuits 101, 102, and 103 are connected to ac source 150 and a dc load 170. An exemplary load 170 may include a field for a generator.

In the illustrated exemplary embodiment, each thyristor in the thyristor bridge circuits 101, 102, and 103 is included in a leg corresponding to the position of the thyristor in the bridge. Thus, for example, thyristor 11 of thyristor bridge circuit 101, thyristor 21 of thyristor bridge circuit 102, and thyristor 31 of thyristor bridge circuit 103 define a first leg in the system 100.

Referring to thyristor bridge circuit 101, each thyristor gate terminal 112 is connected to a thyristor gating unit 110. The thyristor gating unit 110 may also receive a current measurement from each thyristor via a number of methods such as, for example, shunts and Rowgoski coils. In the illustrated exemplary embodiment, Rowgoski coils 111 are connected to the thyristor gating unit 110. The thyristor gating unit 110 is connected to a processor 160. In an alternate embodiment, the Rowgoski coils 111 may be connected to the processor 160 via components that are separate from the thyristor gating unit 110. The thyristor bridge circuits 102 and 103 are similarly connected to thyristor gating units 120 and 130.

In operation, each leg of the system 100 is fired in a sequence that rectifies the ac current. To balance the thyristors in a leg, the individual gating times of each thyristor in the leg may be adjusted slightly such that the current load of the thyristors in a leg is substantially similar. The slight difference in gating times between the thyristors in a leg balances the load, but is small enough to not appreciably affect the rectifying performance of the thyristor bridges.

Figure 3:
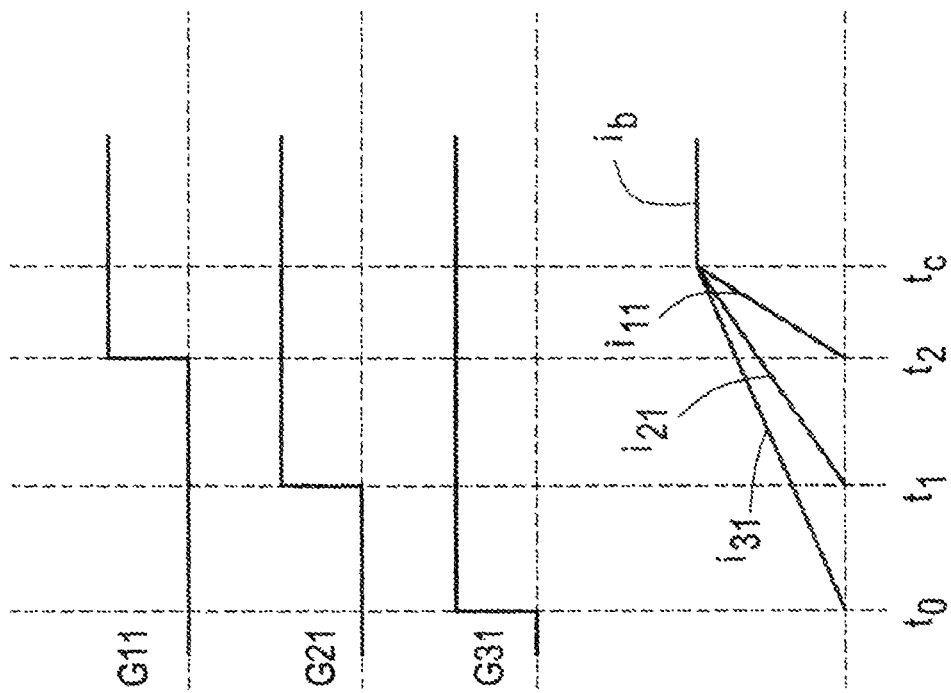
FIG. 3 is a graph illustrating an example of current values for an exemplary unbalanced leg of thyristors.

FIG. 3 illustrates an exemplary resultant current load of a leg of thyristors 11, 21, and 31 when the thyristors 11, 21, and 31 are gated at the same time ($t_0$). G11, G21, and G31 represent the status of the gates. At $t_c$, each of the thyristors 11, 21, and 31 has a different current load ($i_{11}$, $i_{21}$, and $i_{31}$ respectively).

Figure 4:
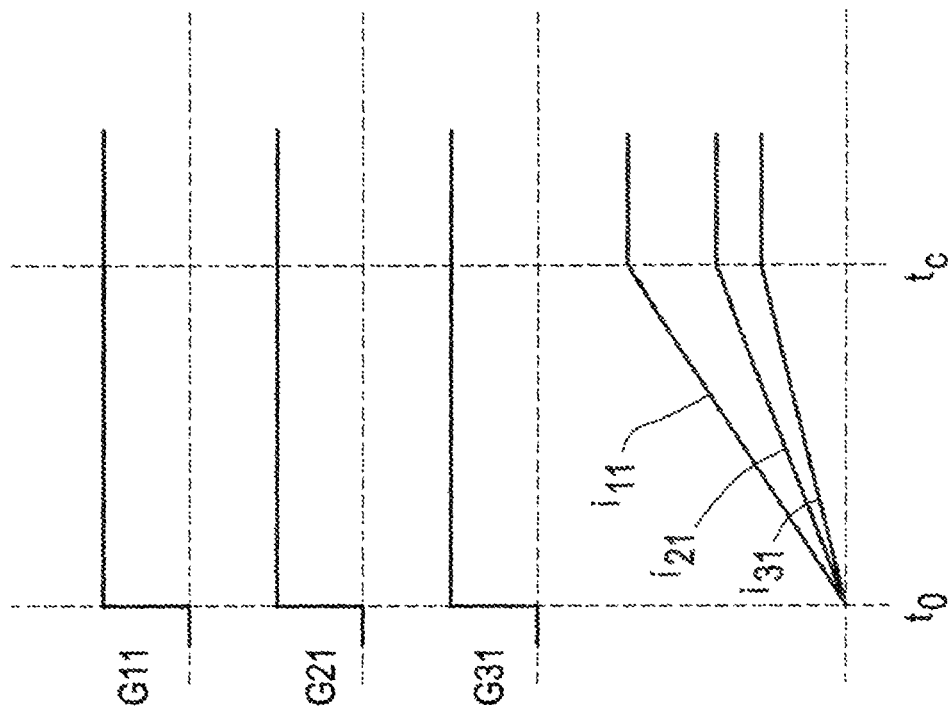
FIG. 4 is a graph illustrating an example of current values for an exemplary balanced leg of thyristors.

FIG. 4 illustrates an exemplary resultant current load of the leg of thyristors 11, 21, and 31 when the thyristors 11, 21, and 31 are gated at an interval that effectively balances the current load of the thyristors 11, 21, and 31. In the illustrated embodiment, thyristor 31 is gated at time ($t_0$), thyristor 21 is gated at time ($t_1$) and thyristor 11 is gated at time ($t_2$). The thyristors 11, 21, and 31 resultant current loads are effectively balanced with each thyristor 11, 21, and 31 having a current load of $t_b$.

Referring to FIG. 1, to balance the load of a first leg that includes thyristors 11, 21, and 31, the processor 160 receives a signal that allows the processor 160 to determine the current of each of the thyristors 11, 21, and 31. The processor 160 uses logic to determine a gate firing time for each of the thyristors 11, 21, and 31 that will substantially balance the current load of the thyristors 11, 21, and 31. The thyristor gating units 110, 120, and 130 receive the gate firing times for the thyristors 11, 21, and 31 respectively from the processor 160 and send signals to the gate terminals 112 to fire the thyristor 11, 21, and 31 gates. The processor 160 receives a second signal with the resultant current of each thyristor 11, 21, and 31 and adjusts the next set of gate firing times until the current load through the thyristors 11, 21, and 31 in the first leg is effectively balanced. This process is repeated for each of the legs in the system 100. Thus, when each leg of the system 100 is fired in sequence, the individual thyristors in each leg share a substantially equal current load.

Figure 2:
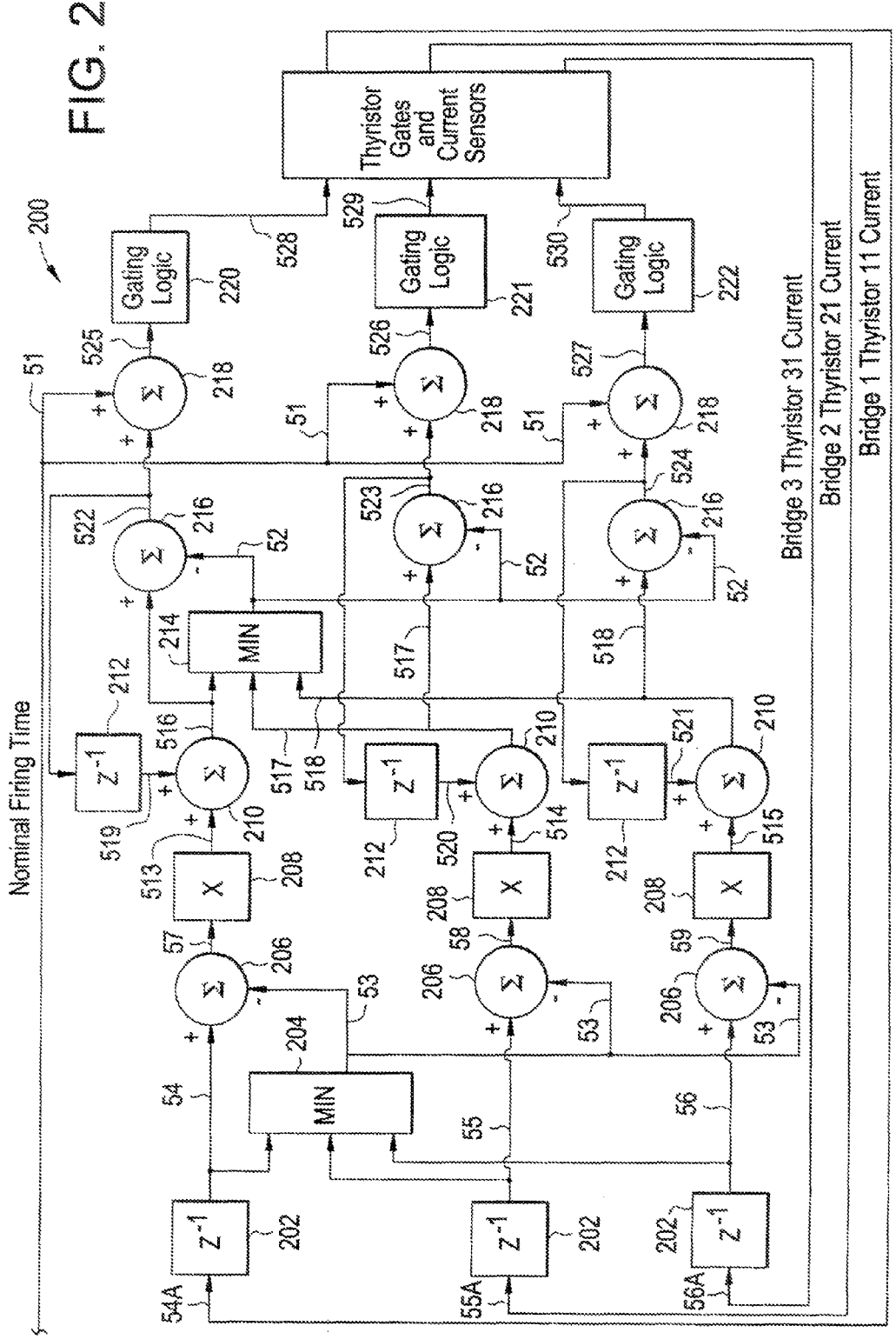
FIG. 2 is a flow diagram of an exemplary method for balancing the current of a leg of thyristors.

FIG. 2 is a flow diagram illustrating exemplary logic 200 used to determine gate firing times for a leg of thyristors. In the illustrated embodiment, the processor 160 (of FIG. 1) is balancing a leg including thyristors 11, 21, and 31. In this regard, the processor 160 calculates the dc current of each of the thyristors 11, 21, and 31 from analog current samples 54A, 55A, and 56A. The current samples 54, 55, and 56 are time delayed versions of 54A, 55A, and 56A following time delay 202. The logic 200 determines the minimum current value 53 at 204. The minimum current value 53 is subtracted from the current samples 54, 55, and 56 at 206. The resultant values 57, 58, and 59 are multiplied at 208 to set integrator gains yielding scaled values 513, 514, and 515. Signals 519, 520, and 521 are past incremental delay times that have been passed through a time delay 212. The scaled values 513, 514, and 515 are added to signals 519, 520, and 521 at 210 resulting in new incremental delay times 516, 517, 518. A minimum new incremental delay time 52 is determined at 214. The minimum new incremental delay time 52 is subtracted from the new incremental delay times 516, 517, 518 at 216. Resulting in incremental delay times 522, 523, and 524. A nominal firing time 51 is added to incremental delay times 522, 523, and 524 at 218 yielding final gate firing times 525, 526, and 527.

The final gate firing times 525, 526, and 527 are sent to gating logic 220, 221, and 222 that may be located in the thyristor gating units 110, 120, 130 (of FIG. 1) respectively or the processor 160. The thyristor gating units 110, 120, 130 send gate firing signals 528, 529, and 530 to the thyristors 11, 21, and 31 (of FIG. 1). Resultant current samples 54, 55, and 56 are returned from the current sensors (Rowgoski coils) 111 (of FIG. 1) following the time delay 202.

The logic 200 is repeated each time the first leg is sequenced to fire, effectively balancing the current load of the first leg. Each additional leg of the system 100 is balanced using logic 200 thereby balancing each leg of the system 100.

An exemplary operation of the logic 200 is illustrated in the table below:

|  | Signal | | | Current | | |
| --- | --- | --- | --- | --- | --- | --- |
|  | 519 | 520 | 521 | 54 | 55 | 56 |
| Interval 1 | 0 | 0 | 0 | 1027 | 555 | 416 |
| Interval 2 | 305 | 69 | 0 | 835 | 621 | 544 |
| Interval 3 | 450 | 107 | 0 | 742 | 647 | 611 |
| Interval 4 | 516 | 125 | 0 | 700 | 658 | 641 |
| Interval 5 | 545 | 134 | 0 | 682 | 662 | 656 |

At a time interval 1, past incremental delay time signals 519, 520, and 521 are all zero and current samples 54, 55, and 56 are 1027, 555, and 416. At interval 2, new past incremental delay time signals 519, 520, and 521 are calculated. As seen from the above table, since current 56 was lowest at interval 1, signal 521 remains at zero at interval 2. The calculation of signal 519 increases most since current sample 54 was largest at interval 2. As more intervals pass, signals 519, 520, and 521 stabilize and the current samples 54, 55, and 56 substantially equalize.

The exemplary embodiments illustrate a system that includes three thyristor bridge circuits each having six thyristors. Other embodiments may comprise two or more thyristor bridge circuits.

This written description uses examples to disclose the invention, including the best mode, and also to enable practice of the invention, including making and using any devices or systems and performing any incorporated methods. The patentable scope of the invention is defined by the claims, and may include other examples. Such other examples are intended to be within the scope of the claims if they have structural elements that do not differ from the literal language of the claims, or if they include equivalent structural elements with insubstantial differences from the literal languages of the claims.

What is claimed:

1. A method for balancing thyristor bridge circuits, the method comprising:
   determining currents of thyristors in a first leg of thyristors of a thyristor bridge circuit;
   determining a first set of gate firing times for the thyristors in the first leg of thyristors responsive to determining the current of the thyristors in the first gate of thyristors, wherein the first set of gate firing times are operative to balance a current load between the thyristors in the first leg of thyristors; and
   gating the thyristors in the first leg of thyristors according to the first set of gate firing times.

2. The method for balancing thyristor bridge circuits of claim 1, the method further comprising:
   determining currents of thyristors in a second leg of thyristors;
   determining a second set of gate firing times for the thyristors in the second leg of thyristors responsive to determining the currents of the thyristors in the second leg of thyristors, wherein the second set of gating firing times is operative to balance a current load between the thyristors in the second leg of thyristors; and
   gating the thyristors in the second leg of thyristors according to the second set of gate firing times.

3. The method for balancing thyristor bridge circuits of claim 1, wherein determining the first set of gate firing times comprises:
   receiving a current value of a first thyristor and a current value of a second thyristor from the first leg of thyristors;
   determining a lowest thyristor current value;
   subtracting the lowest thyristor current value from the current value of the first thyristor and the current value of the second thyristor to yield a first error signal and a second error signal;
   multiplying the first error signal and the second error signal with a gain multiplier to yield a first time delay signal and a second time delay signal;
   integrating the first time delay signal and the second time delay signal to yield a first new time delay signal and a second new time delay signal;
   determining the lowest new time delay signal;
   subtracting the lowest new time delay signal from the first new time delay signal and the second new time delay signal; and
   adding a nominal firing time value to the first new time delay signal and the second new time delay signal to yield a first thyristor gate firing time and a second thyristor gate firing time.

4. The method for balancing thyristor bridge circuits of claim 1, wherein the current of the thyristors of the first leg of thyristors is determined by receiving a signal from a plurality of Rowgoski coils.

5. A system for balancing thyristor bridge circuits comprising:
   a first thyristor bridge circuit, wherein the first thyristor bridge circuit includes a first plurality of thyristors;
   a second thyristor bridge circuit, wherein the second thyristor bridge circuit includes a second plurality of thyristors;
   a first leg comprising a first thyristor of the first plurality of thyristors and a second thyristor of the second plurality of thyristors;
   a processor to determine the current values of the thyristors of the first leg and determine a gate firing time for the thyristors in the first leg responsive to determining the current of the thyristors in the first gate, wherein the gate firing times are operative to balance a current load between the thyristors in the first leg, and send gating signals to the thyristors in the first leg according to the gate firing times.

6. The system for balancing thyristor bridge circuits of claim 5, wherein the system further comprises a thyristor gating unit operative to receive the gating signals from the processor and send the gating signals to the thyristors in the first leg according to the gate firing times.

7. The system for balancing thyristor bridge circuits of claim 6, wherein the system further comprises a serial link between the processor and the thyristor gating unit, operative to send and receive signals between the processor and the thyristor gating unit.

8. The system for balancing thyristor bridge circuits of claim 5, wherein the system further comprises a plurality of sensors operative to send current values of the thyristors of the first plurality of thyristors and the thyristors of the second plurality of thyristors to the processor.

9. The system for balancing thyristor bridge circuits of claim 8, wherein the plurality of sensors includes Rowgoski coils.

10. The system for balancing thyristor bridge circuits of claim 5, wherein the system further comprises a plurality of sensors operative to send voltage values of the thyristors of the first plurality of thyristors and the thyristors of the second plurality of thyristors to the processor, and wherein the processor further includes logic to determine corresponding current values from the received voltage values.

11. The system for balancing thyristor bridge circuits of claim 5, wherein the processor further includes logic to determine the gate firing times by receiving a first thyristor current value and a second thyristor current value, determining a lowest thyristor current value, subtracting the lowest thyristor current value from the first thyristor current value and the second thyristor current value to yield a first error signal and a second error signal, multiplying the first error signal and the second error signal with a gain multiplier to yield a first time delay signal and a second time delay signal, integrating the first time delay signal and the second time delay signal to yield a first new time delay signal and a second new time delay signal, determining the lowest new time delay signal, subtracting the lowest new time delay signal from the first new time delay signal and the second new time delay signal, and adding a nominal firing time value to the first new time delay signal and the second new time delay signal to yield a first thyristor gate firing time and a second thyristor gate firing time.

12. A method for determining a set of gate firing times for thyristor bridge circuits comprising:

receiving a current value of a first thyristor and a current value of a second thyristor from a first leg of thyristors of a thyristor bridge circuit;

determining a lowest thyristor current value;

subtracting the lowest thyristor current value from the current value of the first thyristor and the current value of the second thyristor to yield a first error signal and a second error signal;

multiplying the first error signal and the second error signal with a gain multiplier to yield a first time delay signal and a second time delay signal;

integrating the first time delay signal and the second time delay signal to yield a first new time delay signal and a second new time delay signal;

determining the lowest new time delay signal;

subtracting the lowest new time delay signal from the first new time delay signal and the second new time delay signal; and adding a nominal firing time value to the first new time delay signal and the second new time delay signal to yield a first thyristor gate firing time and a second thyristor gate firing time.

* * * * *